3,647,608
CUT-RESISTANT FOAM ARTICLE
Dale S. Enlow, Cuyahoga Falls, and Lawrence C. Varner, Jr., Akron, Ohio, assignors to The General Tire & Rubber Company
No Drawing. Filed Jan. 26, 1970, Ser. No. 5,934
Int. Cl. B32b 3/26, 5/14, 5/18
U.S. Cl. 161—95
9 Claims

ABSTRACT OF THE DISCLOSURE

Slashing and cutting of foam seats has been one of the principal aspects of vandalism of public and private property. Efforts to protect foam seats from cutting have not been successful because of the high costs involved and the general decrease in comfort arising from use of armor. This situation has caused many seat manufacturers to change to cut-proof, rigid seats. This invention is a cut-resistant foam article, such as a seat, that retains the desirable degree of resiliency and comfort and a method of making the article.

BACKGROUND OF THE INVENTION

Field of the invention

This invention relates to the field of polymeric foams. More particularly, this invention relates to polymeric foam articles and to a method of making them with a cut-resistant surface.

Description of the prior art

Slashing and cutting of foam seats has been one of the principal aspects of vandalism of public and private property. Along with the problem of spreading crime, acts of vandalism have spread to slashing and cutting of other objects such as arm rests, rugs, wall coverings, and draperies. Short of providing 'round-the-clock police protection, manufacturers of these articles have sought to incorporate in the article means to prevent or resist cutting. Particularly in the field of foam cushion seats and furniture, efforts to render foam cushioning cut-resistant have involved the use of thick coverings which lessens or decreases the degree of resiliency in the foam and renders the object uncomfortable to the user as well as making the seat more expensive to manufacture. The failure of these efforts has caused the manufacturers of these articles to hark back to out-dated materials such as cast rigid fiber-reinforced polyester resins, stamped metal, and wood.

These rigid constructions have discouraged much of the vandalism, however, they have caused complaints from users who find them not only uncomfortable but susceptible to many forms of accelerated deterioration such as rust, mold, dampness, and brittleness. There appears, therefore, a need in the industry for a foam article that is either cut-proof or cut-resistant and yet comfortable to the user. The protection required need not be as great as cut-proof but need only be of sufficient magnitude to resist and discourage vandalism.

This invention is an article comprising a foam structure characterized by having a cut-resistant surface and a method of making it. The cut-resistant surface, while not preventing slashing or other vandalistic acts, discourages the occurrence and reoccurrence thereof through a combination of physical and psychological means. Moreover, the foam structure possesses all of the desirable characteristics inherent in foams such as lightness, resiliency (when desired), conformance with the object it supports, warmth, and the ability to be painted and decorated.

Therefore, the main object of this invention is a cut-resistant foam surface and a method of making it. Other objects include a method of making a cut-resistant foam wherein the method is easily modified to fit the exigencies of the product and its use, a method that is simple and straightforward to practice, that requires little equipment in addition to conventional molding apparatus, that may be fitted into conventional molding cycles, and that is amenable to automatic control. The cut-resistant foam structure of the article produced by this method is adaptable to all types of foams (flexible, semi-rigid, and rigid) for a wide range of applications.

SUMMARY OF THE INVENTION

An article comprising a foam structure characterized by having a cut-resistant surface comprising a layer of metal wires, selected from the group consisting of unconnected, randomly oriented, flexible metal fibers and wire mail, embedded in the foam immediately beneath the surface and a method of making the article comprising the steps of applying a thin layer of wear-resistant material to a mold surface, placing in temporary adherence thereto a layer of metal wires selected from the group consisting of unconnected, randomly oriented, flexible metal fibers and wire mail, and applying a foam material over the layer of metal wires in adherence with the wires and the thin layer of wear-resistant material.

DESCRIPTION OF THE PREFERRED EMBODIMENT

This invention applies to articles that comprise or contain foam structures either in toto or in combination with other elements. Examples of articles included herein are automobile seats, bus seats, theater seats, arm rests, wall padding, bar padding, furniture, automobile dashboards, tractor seats, stadium seats, sport and recreation cushions, sofa cushions, and the like. Other elements may be included with these articles such as reinforcing and supporting structures, rigidifying structures, wheels, sun visors, instruments, decorative buttons and knobs, and the like. It is particularly to the foam structure portion of the article that this invention is directed to place or form a cut-resistant surface thereon.

The foam structure of the above-disclosed articles may be any of a wide range of materials. First, the foams may be rigid, semi-rigid, or flexible and vary in density from about 1 to about 50 pounds per cubic foot; examples of these include polystyrene rigid foam and polyurea-formaldehyde rigid foam, polyurethane semi-rigid foam and polyvinyl chloride semi-rigid foam, and polyurethane flexible foam and rubber latex flexible foam. Secondly, the foams may be made from thermoplastic materials, thermosetting materials, and mixtures of the two materials; examples of these include polystyrene foam, polyurea-formaldehyde foam, and polyurethane-polyvinyl chloride foam. Thirdly, the foams may be made from plastics and rubbers; examples of the former include phenolic, polyvinyl chloride, polystyrene, polyurethane, polyethylene, cellulose acetate, and silicone plastic foams; examples of the latter include natural, acrylic, chlorosulfonated polyethylene, epichlorohydrin, ethylene-propylene copolymer, ethylene-propylene-diene terpolymer, fluoroelastomers, isobutylene-isoprene (butyl), isoprene-acrylonitrile, nitrile, polybutadiene, polychloroprene, polyisobutylene, polyisoprene, polysulfide, silicone, styrene-butadiene, and urethane rubber foams. All these materials are contemplated in this invention.

A popular foam structure and one that is particularly applicable to this invention is polyurethane foam which is a thermosetting plastic foam that may be made in rigid, semi-rigid, and flexible form by two general methods. The first and most widely accepted method is to react an isocyanate, which is the reaction product of phosgene and an amine or one of its salts, with a compound containing an active hydrogen, i.e. a compound which gives a positive Zerewitnof test [1]. The second method is to react an alcohol with phosgene to form the alcohol ester of chlorocarbonic acid and then react that with a primary or secondary amine to form the urethane. Optionally, other ingredients may be used in these methods such as water, auxiliary blowing agents, catalysts, and surface active agents.

An example of the first method is the reaction between a polyol (either polyester or polyether) and an organic polyisocyanate with water, fluorocarbons, and catalysts, wherein the polyol reacts with some of the isocyanate to form a chain extended polyurethane, more of the isocyanate reacts with the water to form carbamic acid that breaks down to form a primary amine and carbon dioxide, the carbon dioxide and fluorocarbons expand the polyurethane into a cellular structure or foam, and the primary amine formed from the gas reaction reacts with further isocyanate to form a disubstituted urea which in turn, reacts with more isocyanate to form cross-linking biuret and allophanate structures.

An example of the second method is the reaction between an aliphatic diamine and bischloro formate of a glycol to form the polyurethane. The bischloro formates are obtained by the reaction of phosgene with glycols such as diols and triols.

Polyester polyols are formed from the condensation of a polyhydric alcohol and a polycarboxylic acid. Examples of suitable polyhydric alcohols include the following: glycerol; polyglycerol; pentaerythritol; polypentaerythritol; mannitol; trimethylolpropane; sorbitol; methyltrimethylomethane; 1,4,6 - octanetriol; butanediol, pentanediol; hexanediol; dodecanediol; octanediol; chloropentanediol; glycerol monoallyl ether; glycerol monoethyl ether; triethylene glycol; 2 - ethylhexanediol - 1,4; 3,3'-thiodipropanol; 4,4'-sulfonyl-dihexanol; cyclohexanediol-1,4; 1,2,6 - hexanetriol; 1,3,5 - hexanetriol; polyallyl alcohol; 1,3 - bis(2 - hydroxyethoxy) propane; 5,5'-dihydroxydiamyl ether; tetrahydrofuran - 2,5 - dipropanol; tetrahydrofuran - 2,5 - dipentanol; 2,5 - dihydroxytetrahydrofuran; tetrahydrothiophene - 2,5 - dipropanol; tetrahydropyrrole - 2,5 - propanol; 4 - hydroxy-3-3 hydroxytetrahydropyran; 2,5-dihydroxy - 3,4 - dihydro-1,2-pyran; 4,4' - sulfinyldipropanol; 2,2 - bis(4 - hydroxyphenyl)-propane; 2,2' - bis(4 - hydroxyphenyl)-methane, and the like. Examples of polycarboxylic acids include the following: phthalic acid, isophthalic acid; terephthalic acid; tetrachlorophthalic acid; maleic acid; dodecylmaleic acid; octadecyenylmaleic acid; fumaric acid; aconitic acid, itaconic acid, trimellitic acid; tricarballylic acid; 3,3'-thiodipropionic acid; 4,4'-sulfonyldihexanoic acid; 3-octenedioic - 1,7 acid; 3 - methyl - 3 - decenedioic acid; succinic acid; adipic acid; 1,4 - cyclohexadiene - 1,2 - dicarboxylic acid; 3-methyl - 3,5 - cyclohexadiene - 1,2 - dicarboxylic acid; 8,12-eicosadienedioic acid; 8-vinyl - 10 - octadecenedioic acid; and the corresponding acid anhydrides, acid chlorides, and acid esters such as phthalic anhydride, phthaloyl chloride, and the dimethyl ester of phthalic acid. Preferred polycarboxylic acids are the aliphatic and cycloaliphatic dicarboxylic acids containing no more than fourteen carbon atoms and the aromatic dicarboxylic acids containing no more than fourteen carbon atoms. Polyethers are generally made by reacting an alkylene oxide such as propylene oxide with a strong base such as potassium hydroxide.

A wide variety of polyisocyanate compounds may be used in the polyurethane reaction. Examples of some of these include toluene-2,4-diisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3-dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran, and
2,4,6-toluenetriisocyanate. It is to be understood that mixtures of two or more of these polyisocyanates may be employed. Aromatic isocyanates are preferred, particularly toluene diisocyanate.

Catalysts are added to accelerate the different reactions. The chain-extension reaction, where the polyol reacts with the isocyanate to produce the polyurethane, is accelerated by tertiary amines, especially when they contain a tin co-catalyst. The tertiary amines also catalyze the gas reaction; alkyl morpholines contribute certain physical properties to the foam such as tear resistance and tensile strength. Suitable tertiary amines include triethylene diamine, tetramethyl butane diamine, triethylamine, n-methyl morpholine, N-ethyl morpholine, diethyl ethanolamine, N-coco morpholine, 1-methyl-4-dimethylamine ethyl piperazine, 3 - methoxy-N-dimethyl propyl amine, N-dimethyl-N'-methyl isopropyl propylene amine, N,N-diethyl-3-diethyl amino propyl amine, and dimethyl benzyl amine. Examples of tin cocatalysts include dibutyl tin dilaurate, stannous chloride, dibutyl tin di-2-ethyl hexoate, stannous octoate, and stannous oleate. The surface active agent, when used, stabilizes the cell structure during foam rise and prevents slumping, collapsing, and ripping of the cells.

The cut-resistant surface of the foam structure of this invention comprises a layer of metal wires embedded in the foam immediately beneath the surface. By "embedded immediately beneath" is meant that the layer is positioned within the structure just beneath or under the surface thereof. Generally, the depth ranges from .030 inch (30 mils) to 200 mils depending upon the type of wear resistant material used on the surface. As is explained later, many types of wear resistant surface material may be used; for sheet material such as vinyl sheets, the preferred depth is about 40 to 50 mils and for integral-skin foam such as polyurethane foam, the preferred depth is about 60 to 100 mils. Depths less than about 30 mils permit "strike-thru" of the layer of wires—this is a generally rough or rippled appearance on the surface caused by pressure of the individual wires against the surface. Depths greater than about 200 mils permit too deep of a cut to be made in the foam structure to be repaired easily.

The layer of metal wires does not prevent cutting of the article, however, it does (1) prevent deep cutting (2) dull the cutting blade (3) hamper cutting, and (4) reduce the severity of the cut to the extent that in many cases the foam structure can be repaired. The mere presence of the metal wires immediately beneath the surface of the foam prevents deep cutting. The metal wires can be cut, however, the energy expended in cutting the wires necessarily reduces the overall cutting force and thus de-

---

[1] The Zerewitnof test involves addition of the compound in question to a Grignard solution of methyl iodine; a positive test occurs when the compound decomposes the Grignard reagent to liberate methane gas.

creases the depth of the cut. In addition, the metal wires dull the cutting blade and promotes a psychological deterrent to the vandal by putting him on notice that continuing cutting will eventually ruin his razor or knife. Furthermore, the random orientation of the metal wires in the layer hampers cutting in all directions. Finally, the damaged area of the foam structure (the area lying between the surface and the layer of metal wires) is generally of such moderation that the article can be repaired by methods known in the art such as by the use of adhesive tape, adhesives, sewing or a combination thereof.

The wires comprising the layer of metal wires in this invention may be selected from the group consisting of unconnected, randomly oriented, flexible metal fibers and wire mail. Both of these types of metal wires are operable in this invention and produce all of the desired results thereof; wire mail is generally more expensive than individual metal fibers and for that reason the metal fibers are generally preferred over the mail. The term "fiber" is used in its general definition, i.e. a thread-like structure. As is explained later, the metal fibers may be chosen from a wide range of diameters and lengths and be straight or crooked with a preferred range for each characteristic. The term "mail" is also used in its general definition, i.e. a mesh of wires or a flexible mesh of small metal rings or squares. As in the case of metal fibers, the wire mail may be chosen from a wide range of wire diameters.

The flexible metal fibers and the wire mail may be chosen from a wide range of metals. The primary requirements of the metal are that it be compatible with the foam structure and surface material in which it is used and be difficult, albeit not necessarily impossible, to cut; these requirements necessarily exclude the Group IA and IIA elements of the Periodic Chart of Elements such as lithium, magnesium, sodium, potassium, etc. Preferred among the operable metals for this invention are ferrous metals, particularly mild steel; these metals seen to combine the desirable characteristics of flexibility, resistance to cutting, ease in handling, with favorable costs.

Also operable in this invention, for rigid foam structures only, are wire screen and metal machine millings. Providing the wire in the screen and the millings are of sufficient diameter (at least 47 British Standard Gauge) they will impart sufficient cut-resistance to the rigid foam structure.

It should be noted, however, that wire screen and metal machine millings are not operable in semi-rigid and flexible foam structures. Metal screen takes a "set" when these foams are deflected such as when one sits on them; the "set" appears as a permanent dent in the surface that cannot be fluffed out. Metal machine millings are usually in a spiral configuration and inflexible and have sharp points. When used in semi-rigid and flexible foam structures they tend to puncture the surface during deflection of the foam structure and pose a severe hazard to later handling of the article.

Note should also be made that glass fibers and nut shells are not operable in any foam structure to provide the cut-resistant surface of this invention. Glass fibers are easily cut and of no use whereas the rounded surface of nut shells deflects the cutting blade instead of impeding its progress and thus are also of no use. Non-metals are not generally usable in this invention primarily because they do not possess sufficient resistance to cutting.

The thickness of the layer of metal wires may vary from as thin as about 2 mils (the thickness of a 47 British Standard Gauge wire) to 500 mils or more. Generally, the thickness will vary between about 10 mils and 200 mils as this thickness provides adequate cut-resistance for most product uses.

The metal fibers that form the unconnected, randomly oriented, metal fiber layer may be from about 1/8" to 3" and preferably from about 1/4" to 1" in length and from approximately 5 to 47 and preferably from approximately 25 to 27 British Standard Gauge in thickness. Metal fibers longer than about 3" in length produce a harsh or boardy feel on the surface of the foam structure and tend to take a permanent set (like wire screen) when the structure is subject to compression or deflection. Metal fibers shorter than about 1/8 of an inch do not provide sufficient resistance to cutting because they allow the cutting blade to slip around them instead of forcing the blade to cut them. Metal fibers thicker than about 5 British Standard Gauge are not acceptable because they produce a rippled or mottled appearance on the surface of the foam structure whereas metal fibers thinner than about 47 British Standard Gauge do not provide sufficient resistance to cutting to be of any meaningful value. In the range of 1/8" to 3", the metal fibers should be more flexible in the longer lengths, i.e. from 2" to 3" than in the shorter lengths because the shorter length fiber is more easily displaced in the foam structure than is the longer wire. Thus, the longer length fibers should contain a measure of flexibility to permit them to flex along with the cut-resistant surface during foam deflection.

The wire in the wire mail of this invention may range from about 5 to about 47 British Standard Gauge and the diameter of the mail rings may vary from 1/32 to about 1 inch. The mail may be made from the same metals that were described in connection with the metal fibers, i.e. compatible metals that are cut-resistant. Wire mail is commercially available.

By far the most preferred wire layer is that made from 1/4 inch long metal fibers of 25 British Standard Gauge and made of mild (low carbon) steel such as 1020 ASTM; this wire provides maximum cutting resistance in combination with minimum effect upon the foam structure.

The metal fibers usable in this invention may be other than straight, i.e. they may be slightly crimped or bent. Depending upon the exigencies of the product and its use, such as a foam structure that is highly sculptured, the use of crimped or bent metal fibers may become a necessity to insure the fidelity of the sculptured pattern and yet retain the desired resistance to cutting. Surprisingly, the ends of the straight, bent, and slightly crimped metal fibers do not work their way through the foam structure and puncture the surface as do the thicker, inflexible metal machine millings so that they do not promote a hazardous situation during extensive use.

The method of making the above-described article (comprising a foam structure characterized by having a cut-resistant surface) comprises the steps of applying a thin layer of wear-resistant material to a mold surface, placing in temporary adherence thereto a layer of metal wires selected from the group consisting of unconnected, randomly oriented, flexible metal fibers and wire mail, and applying a foam material over the layer of metal fibers in adherence with the wires and the layer of wear-resistant material. This process may be modified as described later to meet the demands of the product and/or the limitations of the processing equipment.

The layer of wear-resistant material that is applied to the mold surface may be selected from a wide range of flexible sheet materials. Primarily, they should be wear-resistant since they will form the outer surface of the foam structure that is part or all of the article.

These materials may be generally categorized as flexible sheeting and include mono- and multi-layered plastic sheeting, mono- and multi-layered rubber sheeting, expanded or blown plastic sheeting, fabric-backed or faced plastic and rubber sheeting, and the like. The term "flexible" is used to indicate that the sheeting is flexible or bendable in its manufactured state.

The term "plastic" includes thermoplastics, thermoplastic-thermosetting blends, and flexible thermosetting plastics. Examples of these include polyvinyl chloride and polyvinylidene chloride thermoplastics, polyvinyl chloride-polyurethane and polyvinyl chloride-polyurea blends and polyurethane sheeting and foams. Other plastics usable herein include vinyl plastics and copolymers such as polyvinyl chloride-vinyl acetate copolymers, polyvinyl chloride-vinylidene chloride copolymers, polyvinyl acetate, polyvinyl alcohol, and others such as polypropylene, and polyethylene. Other sheeting includes fabric backed or faced plastics such as nylon fabric faced polyvinyl chloride and cotton backed polyvinyl chloride.

The term "rubbers" includes natural, acrylic, chlorosulfonated polyethylene, epichlorohydrin, ethylenepropylene copolymers, ethylene-propylene-diene terpolymer, fluoroelastomer, isobutylene-isoprene (butyl), isoprene acrylonitrile, nitrile, polybutadiene, polychoroprene, polyisobutylene, polyisoprene, polysulfide, silicone, styrene-butadiene, and urethane rubber. Other sheeting include fabric backed or faced rubber sheets such as nylon fabric faced styrene-butadiene rubber sheets and coton backed polychloroprene sheets. All these materials are contemplated in this invention.

Layers and sheets of these flexible materials may be made by numerous processes known in the art. For example, sheets of polyvinyl chloride may be made by blending a plastisol grade polyvinyl chloride powder with a liquid plasticizer, such as dioctyl phthalate, casting the fluid into a thin layer and subjecting it to heat whereby the plastic particles absorb the plasticizer and swell into a semi-solid (gel) sheet. Upon further heating the swollen particles fuse together to form a continuous sheet of flexible plastic. Other plasticizers usable in this process include other phthalates, phosphates, sebacates, adipates, polymeric plasticizers, epoxy plasticizers, and chlorinated diphenyls. Another process of making flexible plastic sheeting is to blend plastics such as polyvinyl chloride copolymers with plasticizers in a Banbury mixer and calender the mix into sheets.

Sheets of rubber materials may be made by such processes as casting a rubber latex containing vulcanizates, onto a surface (release paper or cloth) and drying and vulcanizing the rubber into a continuous sheet. Another method is to blend a rubber with fillers, extenders, reinforcing agents, lubricants, stabilizers, and curing agents in a Banbury mixer and extrude or calender the mixture into a sheet and cure it in an oven.

Blown or expanded sheeting is produced by including a blowing agent, that gassifies upon heating or other treatment, in the plastisol or Banbury mix. Also, a laminate of plastic or rubber sheets may be made wherein one or more contain a blowing agent so that the final product is a blown or expanded laminate. Examples of blowing agents used to make expanded flexible sheeting include azodicarbonamide (azobisformamide) (ABFA), azodiisobutyronitrile (AZON), benzenesulphonhydrazide (BSH), p-toluene sulfonyl semicarbazide (TSSC-RA), N,N'-dimethyl N,N'-dinitrosoterphthalamide (DMDNTA), trihydrazino triazine (THT), nitrogen, carbon dioxide, pentane, fluorocarbon (11, 12, 113, 114), and methylene chloride.

A further method is to melt polyethylene or polypropylene and extrude it into a sheet. A still further method is to make a reactive mixture of an organic isocyanate, which is the reaction product of phosgene with an amine or one of its salts, with a compound containing an active hydrogen, i.e. one that gives a positive Zerewitnof test (described earlier) such as a polyester or polyether polyol and cast this mixture into a thin layer and allow it to react to form a flexible polyurethane sheet. Modification of this latter method produces layers having a hard wearing, abrasion resistant skin integral with the foam, known in the art as "integral skin foam."

The thin layer of wear-resistant material may be applied in final thicknesses from about 30 mils to about 200 mils (described earlier) to the mold surface by a variety of methods known in the art. Examples of such methods include vacuum-forming (for vacuum-formable material), spraying or applying liquid film-forming compounds (such as liquid plastisol resins) onto the surface and drying or curing them, and other methods such as slushmolding.

The mold surface to which the thin layer of wear-resistant material is applied may comprise virtually any surface that is usable as a mold surface such as a metal mold surface, a plastic mold surface, and a rubber mold surface. Specifically, the mold surface may be contained in a variety of molds such as a silicone rubber mold similar to that used in the furniture industry, an open-topped or closed-topped beryllium-copper mold such as that used in the intermittent manufacturing process of foam articles such as seat cushions, and a continuous flexible belt that is used in continuous manufacturing processes of foam slabs. Further, the mold may be made from a magnetizable metal for use in conjunction with magnetizable metal wires to aid in achieving temporary adherence to the thin layer of material on the mold surface.

The second step in the process is to place in temporary adherence to the thin layer of wear-resistant metal on the mold surface a layer of metal wires selected from the group consisting of unconnected, randomly oriented, flexible metal fibers and wire mail. The flexible metal wires and wire mail, described in detail above, are placed in temporary adherence to the thin layer of material so that in the later step of applying a foam material over the layer of metal wires, the metal wires are kept in a uniform layer immediately below the surface of the foam structure and are not moved about through the foam structure to become ineffective as a cut-resistant layer.

The temporary adherence of the layer of metal wire to the thin layer of material need not be carried to such a degree that a fully bonded laminate is formed although such a situation is fully operable and is many times desirable. Partial or total bonding of the layer of metal wires to the thin layer of wear-resistant material may be accomplished by use of an adhesive layer between the thin layer of wear resistant material and the layer of metal wires. The adhesive may be applied either to the thin layer of material, to the layer of metal wires, or both.

A wide range of adhesives may be used in this respect. Examples of these include acrylics, alkyds, bitumens, casein, cellulose acetate, cellulose caproate, cellulose nitrate, cyanoacrylate, epoxy-polyamide, phenolic-polyamide, phenolic-vinyl, polyamide, polyisobutylene, polystyrene, polyvinyl acetal, polyvinyl acetate, rosin, epoxides, furanes, melamineformaldehyde, oleoresins, phenol-formaldehyde, phenolic-epoxy, phenolic-neoprene, phenolic-nitrile, polyesters, polyurethanes, resorcinol-formaldehyde, urea-formaldehyde, polychloroprene, and acrylonitrile-butadiene adhesives. These may be applied in a wide variety of ways such as spraying, roll-coating, brushing, etc.

Other means of obtaining temporary adherence of the layer of metal wire to the thin layer of material is possible such as through the use of tacky integral skin plastic and magnetic fields as will be explained later.

In the case of wire mail, it may be merely draped over the thin layer of wear-resistant material on the mold surface in such a manner as to be placed in temporary adherence thereto. The flexibility of the mail is generally sufficient to permit it to conform to a wide range of surface irregularities and sculpturing without undue folding and lumping.

In the case of the flexible metal fibers, they are placed on the thin layer of wear-resistant material in an unconnected, randomly oriented layer. By "unconnected" is meant that they are not linked together to form a mechanical interlocking structure such as in the case of the mail. By "randomly oriented" is meant just that, they are randomly oriented in contrast to a deliberate orientation. This random orientation may be accomplished by sprinkling or scattering the metal fibers over the thin layer of material. It should be noted that it is not possible to mix the fibers or the mail in the liquid film forming material and cast it upon the mold surface because the fibers and the mail will sink through the liquid film forming material to the mold surface and form an unappealing and possibly hazardous surface.

When using the above-described integral skin foam, one may apply a thin layer of a mixture of integral skin foam reactants to a surface and after it expands into the integral skin foam, but prior to its fully cured state, i.e. during the "tacky" stage, place the layer of metal wires onto the tacky surface so as to achieve a temporary bonding thereto. This modification of the process eliminates the necessity of an adhesive. In addition to the aforedisclosed integral skin polyurethane foam, other polymeric foams may be compounded into self-skinning or integral skin formulations; these include such compounds as polyvinyl chloride foam, acrylonitrile-butadiene-styrene foam, and polychloroprene foam.

A unique modification of this invention is achieved by combining magnetizable metal wires and a magnetizable or magnetized mold to achieve temporary adherence of the layer of metal wires to the thin layer of wear-resistant material. By establishing a magnetic field in and around the mold surface, the layer of metal wires, either the wire mail or the unconnected, randomly oriented, flexible metal fibers, are held in temporary adherence to the thin layer of material on the mold surface. For this modification both the metal wires and the mold surface must contain magnetizable metals such as cobalt, cobalt-iron, wrought iron, cast iron, steel, manganese steel, nickel, and Vicker's steel. The magnetic field may be achieved in a variety of ways such as by placing a coil of an electric conductor about the mold and energizing it to form an electromagnetic field about the mold, or by magnetizing the mold to create a magnetic field in situ.

The third step in this method is to apply a foam material over the layer of metal wires in adherence with the wires and the thin layer of wear-resistant material. The foam material may be applied in a variety of ways such as by pouring a mixture of polymeric foam reactants over the layer of metal wires to expand into a foam that rises and fills the mold and bonds to the wires and material. Another method is to pre-form a foam to the contour of the mold surface and after applying the thin layer of material and layer of metal wires over the surface, insert the pre-molded foam material into the mold in such a manner to fully bond to the wires and material. This bonding may be enhanced by applying adhesive over the metal wires and material prior to inserting the foam material therein—the same adhesives as described earlier in connection with achieving temporary adherence of the metal wires to the layer of wear resistant material.

Foams usable in this step are the same foams as those described earlier for the foam structure of the article and include polyurethane foams. As is well known in the art, it may become necessary to cure or otherwise complete the formation of the foam structure after applying the foam material over the layer of metal wires and layer of material and such is fully contemplated in this invention.

The types, sizes, and lengths of wires used in this method are the same as described earlier for the article. By a judicious choice of material, metal wires, and foam material, a wide variety of products may be produced having a wide variety of end uses. All of these products, however, will contain the beneficial aspect of this invention, that being an article comprising a foam structure characterized by having a cut-resistant surface.

What is claimed is:

1. An article comprising an organic polymeric foam structure characterized by having a cut-resistant surface comprising a layer of metal wires, selected from the group consisting of unconnected, randomly oriented, flexible metal fibers and wire mail, embedded in said organic polymeric foam immediately beneath said surface.
2. The article of claim 1 wherein said flexible metal fibers are from about ⅛ to about 3 inches in length.
3. The article of claim 1 wherein said flexible metal fibers are from about ¼ to about 1 inch in length.
4. The article of claim 1 wherein said metal wires are from about 5 to about 47 British Standard Gauge.
5. The article of claim 1 wherein said metal wires are from about 25 to about 27 British Standard Gauge.
6. The article of claim 1 wherein said flexible metal fibers are about ¼ inch in length, are about 26 British Standard Gauge, and are made of mild steel.
7. The article of claim 1 wherein said organic polymeric foam is polyurethane foam.
8. The article of claim 1 wherein said organic polymeric foam is integral-skin polyurethane foam.
9. The article of claim 1 having a sheet of flexible organic plastic adhered to said surface.

References Cited

UNITED STATES PATENTS 3,298,884   1/1967   Willy _____ 161—89

WILLIAM J. VAN BALEN, Primary Examiner

U.S. Cl. X.R.

161—159, 160, 161, 162, 164, 165